June 2, 1925.

D. C. HAYWARD

RIDING ATTACHMENT FOR WALKING PLOWS

Filed Sept. 11, 1922

1,540,625

Darley C. Hayward, INVENTOR.

BY David E. Lain,

ATTORNEY.

Patented June 2, 1925.

1,540,625

UNITED STATES PATENT OFFICE.

DARLEY C. HAYWARD, OF CUSTER TOWNSHIP, WHATCOM COUNTY, WASHINGTON.

RIDING ATTACHMENT FOR WALKING PLOWS.

Application filed September 11, 1922. Serial No. 587,307.

*To all whom it may concern:*

Be it known that I, DARLEY C. HAYWARD, a citizen of the United States, and a resident of the township of Custer, in the county of Whatcom and State of Washington, have invented a new and useful Riding Attachment for Walking Plows, of which the following is a specification.

My invention relates to improvements in riding attachments to walking plows, and one of the objects of my improvements is to provide an attachment which will cause the plow to maintain a true furrow when the plowman is riding, another object of my improvements is to provide an attachment which permits the plowman to turn the plow and attachment over on the moldboard side to pass an obstruction by using the plow handles in the usual way with little more than the usual effort, another object of my improvement is to provide a gage wheel by which the depth of furrow can be controlled from the plowman's seat easily by a single lever, another object of my improvement is to provide a controllable gage wheel which will, if permitted, automatically lift the plow out of the ground by the forward movement of the same, another object of my improvements is to simplify the control of the adjustable parts, and a further object of my improvements is to provide a design adapted to a simple, light, strong and durable construction attachable without drilling new holes in the plow.

Figure 1:
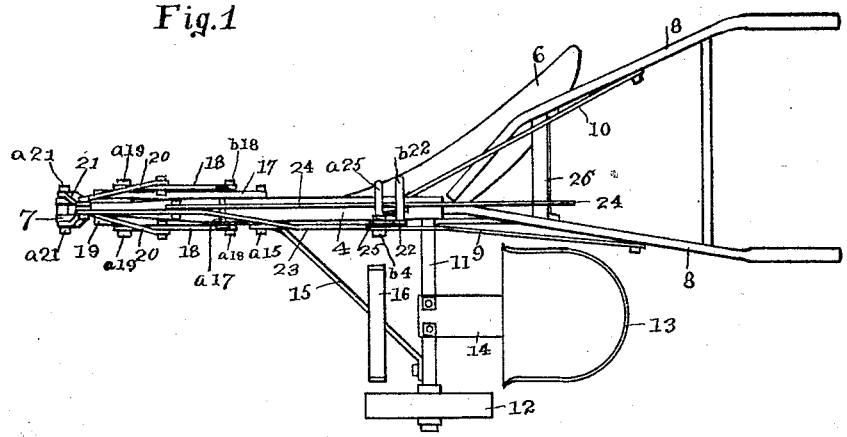
Figure 2:
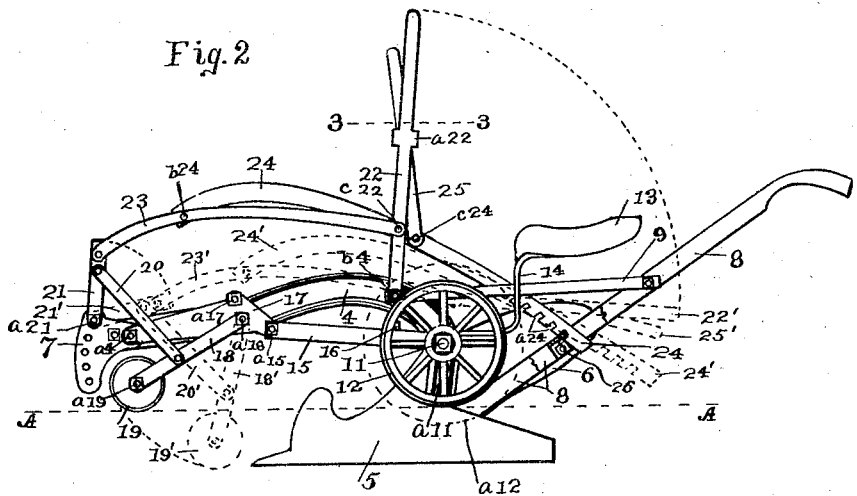
Figure 3:
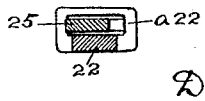

I attain these objects with the mechanism illustrated in the accompanying sheet of drawings in which Figure 1 is a plan view of a walking plow with my attachment in place, Fig. 2 is a side elevation of Fig. 1, and Fig. 3 is a plan section of the control lever on line 3—3 of Fig. 2, drawn on a larger scale.

Similar characters refer to similar parts throughout.

Certain parts are broken away to show others hidden thereby.

More particularly: The upper surface of the ground is indicated by dotted line A—A in Fig. 2. The walking plow illustrated is of ordinary design for a steel beam plow and has beam 4, and side 5, mold board 6, clevis attachment 7, handles 8, 8, and handle braces 9, and 10. My attachment consists of the following parts: Wheel axle 11, the inner end of which is bent downward at right angles and fastened with the bolts used to fasten the plow beam to the moldboard shown at $a^{11}$. Preferably the axle is nonadjustable with reference to the plow. Wheel 12 mounted for revolution on the outer end of axle 11 is of diameter suited to hold the plow plumb when at furrow depth and when said wheel runs on the unplowed ground at the level of A—A. As illustrated wheel 12 provides for a furrow depth of seven inches. Although the furrow depth is controllable by other means, to be described, when the furrow is not desired as deep as this at $a^{11}$ a wheel shown in dotted line at $a^{12}$ of a diameter suited to the extreme furrow depth desired replaces wheel 12. Plowman's seat 13 is fastened to spring support 14 which is fastened to axle 11. Axle brace 15 is fastened to said axle and by fishplatebolt $a^{15}$ to the plow beam. Foot rest 16 is fastened to brace 15 within foot reach of seat 13. A pair of fishplates 17, 17 are clamped to beam 4 by bolts $a^{15}$ and $a^{17}$, below and above said beam and bolt $a^4$ through one of the holes used for fastening clevis attachment 7. Gage wheel arms 18, 18 are pivoted to fishplates 17 and 18 by stud screws $a^{18}$ and $b^{18}$, in said plates respectively, and the other ends of arms 18 hold pin $a^{19}$ on which is mounted gage wheel 19 for revolution. The lower ends of links 20, 20 are pivoted to arms 18, 18 and the upper ends to lever 21. Lever link 21 is bifurcated below to span swivel attachment 7 to the top hole of which it is pivoted by bolt $a^{21}$. Control lever 22 is pivoted at its lower end on handle-brace bolt $b^4$, has eye $a^{22}$, see Fig. 3, about midway of its length and handle $b^{22}$ at right angles from its upper end. Horizontal link 23 is pivoted to the upper end of lever 21 and to hand lever 22 to cause parallel movements of said levers. Holding bar 24 is pivoted to link 23 at $b^{24}$ and has a rack of notches $a^{24}$ in its other end engageable with catch bar 26 which is bolted between the lower ends of plow handles 8 at a place usually occupied by a round or rung. Midway of holding bar 24 is pivoted the lower end of lifting rod 25, which passes through eye $a^{22}$ on hand lever 22, and on its upper end is handle $a^{25}$ at right angles therewith and below and sufficiently close to handle $b^{22}$ so that both can be grasped by a hand.

It can be seen that only two new fastening places are added to those already on plows of the type illustrated; viz, bolt $a^{15}$, through fish-plates 17, 18, to which is fastened axle brace 15, and screw studs $a^{18}$ and $b^{18}$, which are in line and really constitute a single fastening or pivot for arms 18. These are also in said fish-plates, which are clamped to the plow beam to provide these fastening places.

In operation: Fig. 2, in full lines, shows the riding plow as in a furrow about seven inches deep with the ground surface at A—A. Gage wheel 19 rolls beneath the front end of plow beam 4 on the unplowed ground, and its position, as determined by which of notches $a^{24}$ is engaged with catch 26, fixes the depth of furrow being plowed. To engage holding bar 24 in another notch lifting-rod handle $a^{25}$ is drawn by a hand grasp toward hand-lever handle $b^{22}$ and hand lever 22 shifted till the desired set of wheel 19 is had when handle $a^{25}$ is loosed and bar 24 drops to engage the nearest notch with catch 26. As lever 22 is drawn toward the plowman wheel 19 is forced further downward, causing the furrow made to become more shallow, till said gage wheel reaches its lowest position at 19' close to the plow point when the plow is on the surface of the ground and adapted for running thereover without turning the ground and wheel 19 runs so closely to the plow point that loose stuff can not pass between. It is found practicable to vary the depth of the furrow being plowed by simply setting wheel 19, since the inclination of the plow caused by the lowering of the outer end of axle 11 does not interfere with the true running properties of the plow till this inclination is considerable. But for widely different depths of furrows the wheel $a^{12}$ is provided of a diameter to retain the plow in substantially a vertical position.

To put wheel 19 in its lowest position at 19' lever 22 is carried to its dotted-line position at 22', where pivot $c^{22}$ has passed below pivot $b^4$ and said lever is locked in its lowest position, and the plow can be drawn over the surface without risk of its being thrown into operative position.

When in operation and it is desired to depress wheel 19 by moving lever 22 this action is made easier by the said wheel being crowded toward the plow by the obstacles encountered by it as it rolls over the ground.

It has been found that a plow, equipped as shown, keeps its furrow with greater certainty when ridden than is the case when the plowman controls at its handles. The weight of the outrigging on the land side does not cause undue difficulty in turning the plow over its moldboard by its handles.

In practice my non-adjustable axle 11 and wheel 12 have been found to be entirely practical for a wide range of furrow depths when controlled by adjustable gage wheel 19. The greater lightness, simplicity and strength thus made possible overcomes the inconvenience of replacing wheel 12 with one of different diameter on the rare occasions when it is desirable.

Having thus disclosed my invention, what I claim as new and desire to secure by Letters Patent is,—

1. The combination of a walking plow, a wheel axle one end of which is fastened to the plow beam thereof projecting landward therefrom, a land wheel mounted for revolution on the outer end of said axle, and a driver's seat supported by said axle, of a gage-wheel arm pivoted to the forward end of the plow beam for vibration beneath the same, a gage wheel mounted for revolution on an axle on the lower end of said gage-wheel arm forward of the plowshare point, a lever link fulcrumed to the forward end of the plow beam vibratable above the same, a link pivoted to said gage-wheel link and to said lever link, a hand-control lever pivoted to said plow beam near said axle to vibrate above said beam, a horizontal link pivoted to said lever link and said control lever, a holding bar having spaced notches underneath in its rear end and pivoted to said horizontal link forward of said notches separate engageable with a catch bar, and a catch bar fastened to the plow adapted to engage said notches.

2. The combination of a walking plow, a wheel axle, one end of which is fastened to the plow beam thereof projecting landward therefrom, a land wheel mounted for revolution on the outer end of said axle, and a driver's seat supported by said axle, of a gage-wheel arm pivoted to the forward end of the plow beam for vibration beneath the same, a gage wheel mounted for revolution on an axle on the lower end of said gage-wheel arm forward of the plowshare point, a lever link fulcrumed to the forward end of the plow beam vibratable above the same, a link pivoted to said gage-wheel link and to said lever link, a hand-control lever having a lateral eye pivoted to said plow beam near said axle to vibrate above said beam, a horizontal link pivoted to said lever link and said control lever, a holding bar having spaced notches underneath in its rear end and pivoted to said horizontal link forward of said notches separately engageable with a catch bar, a catch bar fastened to the plow adapted to engage said notches, and a lifting rod pivoted to said holding bar and engaged in said lateral eye on said control lever.

DARLEY C. HAYWARD.